United States Patent [19]

Harris

[11] 3,977,785

[45] Aug. 31, 1976

[54] METHOD AND APPARATUS FOR INHIBITING THE OPERATION OF A COPYING MACHINE

[75] Inventor: Ellis D. Harris, Claremont, Calif.

[73] Assignee: Xerox Corporation, Stamford, Conn.

[22] Filed: Jan. 6, 1975

[21] Appl. No.: 538,650

[52] U.S. Cl. .................................. 355/133; 250/556

[51] Int. Cl.$^2$ .......................................... G03B 15/00

[58] Field of Search ......................... 355/133; 427/7; 250/556, 570; 428/916; 283/6

[56] References Cited

UNITED STATES PATENTS

| | | | |
|---|---|---|---|
| 3,713,861 | 1/1973 | Sharp | 283/6 X |
| 3,831,007 | 8/1974 | Braun | 250/556 X |
| 3,852,088 | 12/1974 | Godlewski et al. | 355/3 R X |

OTHER PUBLICATIONS

IBM Tech. Disclosure Bulletin, Boggs et al., Copier Incorp. Doc. Detect. System, vol. 15, No. 7, 12-72.

*Primary Examiner*—R. L. Moses
*Attorney, Agent, or Firm*—James J. Ralabate; Franklyn C. Weiss; Irving Keschner

[57] ABSTRACT

A simple optical correlation system for preventing unauthorized copying of selected documents wherein documents (and copy paper) comprise paper having coded information thereon (visible or invisible) which is optically correlated with a protection device within a copying machine. When light emanating from the copying machine light source is directed to the document, light transmitted from the coded area of the document, which may comprise the entire page area, is sensed by optical detectors within the machine. A reference pattern is positioned between the document and the optical detectors. When the document code and the reference pattern are correlated, the output signal from the reference document is detected and coupled to appropriate circuitry wherein the copying machine is allowed to initiate a copying sequence. If the code on the document and the pattern on the reference document are not correlated, the copying machine is inhibited from operation.

22 Claims, 9 Drawing Figures

29

METHOD AND APPARATUS FOR INHIBITING THE OPERATION OF A COPYING MACHINE

BACKGROUND OF THE INVENTION

The widespread use of copier/duplication machines in recent years has caused obvious problems associated with the ease and convenience of making copies of documents with these machines. For example, situations arise wherein it is desired that particular documents should not be reproduced or should be reproduced only by members of a defined control group. In particular, a document may contain information of a confidential or classified nature, the contents of which are meant to be restricted to a few individuals or only one individual. Further, the problem of unauthorized copying of copyrighted materials has not, at this date, been successfully addressed.

The prior art has generated various techniques which have sought to prevent unauthorized copying of documents, particularly in view of the proliferation of copying machines which makes it extremely easy to reproduce almost any document. One prior art technique relies on reducing the spectral contrast of the information on the selected document when it is being copied while maintaining the readability of the document without utilizing peripheral equipment. In particular, U.S. Pat. No. 3,713,861 discloses a technique wherein light emanating from the exposure source is directed to the surface of a document, the surface having been overcoated with a selected fluorescent film, the entire document fluorescing when irradiated by the light thereby eliminating contrast (and therefore no image impression) on the copy. The disadvantage to this technique is that a fluorescent coating must be selected and applied to each document to be made copy-proof, the attendant handling procedures causing obvious problems. Further, the fluorescent coating must be selected to absorb most of the radiation emitted from the exposure light source. In this case, if a document is coated with a fluorescent material which absorbs radiation in the region between 5100–5350 and the light emitted by the exposure light source is in the region between 5100–5500A., the disclosed system would be effective. However, if the copying device utilizes an exposure source emitting radiation in a region greater than 6000A., the system would be ineffective.

Another prior art technique prints specularly reflective patterns or spectral background on a document with a particularly colored ink (i.e., blue or yellow). However, this technique is only effective with copying machines having a limited spectral response.

In general, however, as the spectral response of copying machines improves, it becomes increasingly difficult to produce non-copyable documents which can be easily read without peripheral equipment.

Another solution to the problems suggested by the aforementioned patent is to make the master copy on an outsized paper, thereby making it difficult to reproduce master copies because they would not conform easily to the exposure station of conventional copying machines. The solution is impractical from a handling and expense point of view since special paper will have to be cut and images enlarged or reduced for placement on the copier, and copying is not prevented but only made inconvenient.

A proposed technique to solve the aforementioned problem would be to modify existing copying machines whereby an event would be triggered when a sensitive document is to be copied. This sytem requires that the original documents have a code, or signature, which the modified copy machine can recognize. Typical codes include either visible or invisible codes, patterns, or marks written with materials that can be identified by any of the following characteristics: ultraviolet or infrared radiation, visual reflective or transmissive, magnetic, electrostatic or chemical. For example, a chemical additive could be added to the sensitive document paper which could be chemically "sniffed" by apparatus in the copying machine. A drawback in the use of a code recognition copying system as proposed in the prior art would be that the system would be complex and expensive to make.

Therefore, copying machine inexpensively modified to optically respond to codes on a sensitive document would be desirable. In particular, a technique which optically correlates an image from an optically patterned document with a comparison image, and detects a correlation signal which is used to inhibit and/or control copying of a non-conforming document and would be simply incorporated in existing copying machines would be an advance in the prior art.

SUMMARY OF THE PRESENT INVENTION

The present invention provides a simple optical correlation system for preventing unauthorized copying of selected documents which overcomes the problems of the prior art described hereinabove. In particular, the documents (and copy paper) comprise paper having coded information thereon (visible or invisible) which is optically correlated with a protection device within the copying machine. When light emanating from the exposure light source is directed to the document, light transmitted from the coded area of the document is sensed by optical detectors within the machine. A reference pattern is positioned between the document and the optical detectors. When the document code and the reference pattern are correlated, the output signal from the reference document is detected and coupled to an appropriate logic circuitry wherein the copying machine is allowed to initiate a copying sequence. If the code on the document and the pattern on the reference document are not correlated, the copying machine is inhibited from operation.

The present system is thus distinct from copy prevention techniques wherein special features are added only to the documents to be protected thereby preventing only copying of these documents. The special feature additions to the copiers allows for a higher control including accountability for royalty payments, executive override, etc. albeit the system disclosed is only effective when copiers are modified in accordance with the system described. This is particularly suitable for those areas wherein a measure of administrative control is essential and where limited access to copy areas may be acceptable or is required.

OBJECTS OF THE INVENTION

It is an object of the present invention to provide method and apparatus for inhibiting copying of documents which are not coded in a predetermined manner.

It is a further object of the present invention to provide a copying machine which utilizes optical correlation techniques to prevent copying of predetermined documents.

It is still a further object of the present invention to provide apparatus which utilizes optical correlation techniques to prevent copying of document originals and copies thereof which are not coded in a predetermined manner.

It is still a further object of the present invention to provide copying apparatus modified to incorporate optical correlation techniques therein, a coded document being exposed to light from an exposure source, the light emanating from the coded portions of the document being directed to an optical reference having a pattern optically correlated to the document code. If correlation is present, an optical signal is transmitted by the reference and detected, the detected output signal being processed by electronic techniques to allow copying of the document.

DESCRIPTION OF THE DRAWINGS

For a better understanding of the invention as well as other objects and further features thereof, reference is made to the following description which is to be read in conjunction with the following drawing wherein.

DESCRIPTION OF THE PREFERRED EMBODIMENTS

Figure 1:
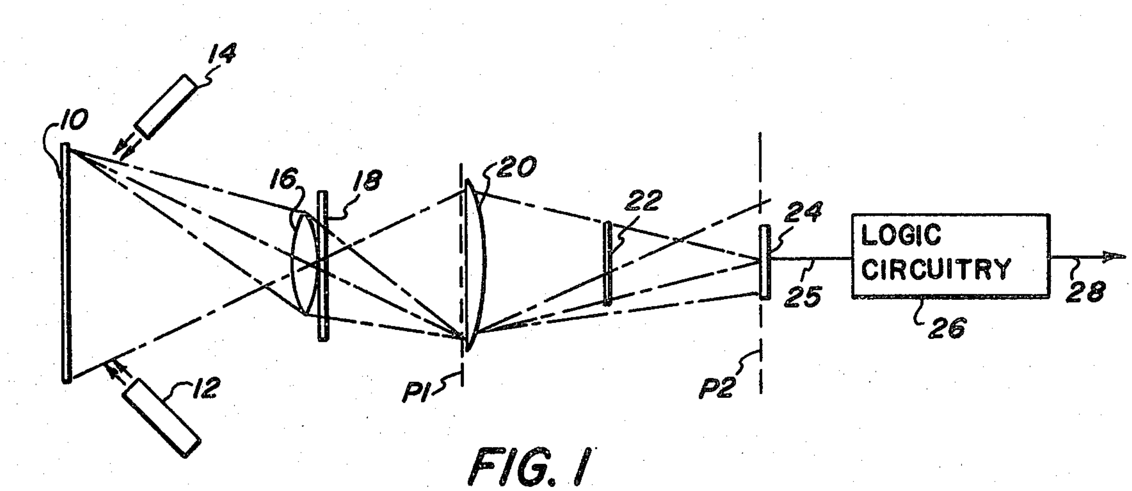
FIG. 1 illustrates apparatus for implementing a first embodiment of the present invention.

Referring now to FIG. 1, a first embodiment of the present invention is illustrated. A document 10, having a predetermined code, or signature, such as a watermark, thereon is placed on the exposure plates of the copying machine to be utilized and is exposed to radiation from exposure sources 12 and 14. Although in the embodiment illustrated document 10 is substantially opaque, document 10 obviously may comprise a transparancy (in this case, the radiation emanating from the exposure sources would be transmitted through the document for further processing). The radiation reflected from document 10 (and the code thereon) is imaged by imaging lens 16 through a spectral filter 18 which only passes radiation of a predetermined spectral content. The radiation transmitted through lens 16 and spectral filter 18 forms a virtual image of document 10 at plane P1. Optical energy from the virtual image at P1 in turn is redirected by field lens 20 through a reference transparency 22, which forms a correlation pattern at plane P2 by introducing a transform of the code as an optical transparency. When optical correlation is present, this correlation pattern will be characterized by an intense point of radiation (a point of light if the exposure radiation was visible light) on a uniform / / / / / background of lower brightness. A photodetector array 24 is positioned at plane P2 and generates an electrical output signal which is proportional to the intensity distribution of the radiation incident thereupon. The output of the photodetector is coupled to logic circuitry 26 which generates an output signal on lead 28 when it determines that correlation exists between the coded document 10 and the reference transparency 22. As set forth hereinafter, the signal on lead 28 is utilized to enable the copying machine embodying the apparatus of FIG. 1 if the information on document 10 is correlated with the information on reference transparency 22. The apparatus shown in the figure is adapted for use in those copying machines in which light exposure is required such as in those machines using the xerographic process. The apparatus shown in the figure should be positioned in a manner whereby the actual copying process can proceed without interference with the additional apparatus illustrated.

An appropriately positioned photodetector array along the plane P2 can be utilized to detect the presence of a pattern on document 10 and also to indicate its location thereon. When the pattern on document 10 is equivalent to the pattern on reference transparency 22, a signal above a predetermined threshold is detected by the array 24 and transmitted via logic circuitry 26 and lead 28 to the copy enable system with the copying machine. The detected signal is of greater intensity at the optical axis of the photodetector elements. Since the system is shift invariant, there is no need to align the pattern on document 10 and reference transparency 22 as long as they are within the defined optical system.

Figure 5:
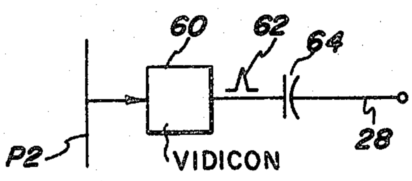
FIG. 5 shows apparatus for converting the output at the correlation plane into a copy enable signal.

The photodetector array comprises a plurality of photodetectors, or photodiodes, which convert an optical signal into an electrical signal on lead 25 for identification by logic circuitry 26. The number of photodetectors depends on the correlogram resolution required which in turn is dependent upon security requirements. As will be explained hereinafter with reference to FIG. 2*a* and 2*b*, if five reference patterns are included on the document (and reference transparency), five photodetectors should be provided. A simplified embodiment of the logic circuitry which may be utilized is shown in FIG. 5 although more complex means such as a digital computer programmed to recognize when the desired pattern has been identified may be utilized. The individual photodetectors may be interrogated in a conventional manner in a timewise or stepwise sequence to determine the presence or absence of an electrical signal which in turn indicates whether a particular pattern has been identified.

In summary, the reference transparency 22 is a minified copy of the pattern to be recognized. If the reference transparency 22 contains the pattern to be recognized, light exceeding some predetermined threshold value will be projected upon the output plane P2. If the pattern is not included on the reference transparency 22, the light projected therethrough will be so dispersed as to have an intensity that remains below the predetermined threshold.

Figure 2A:
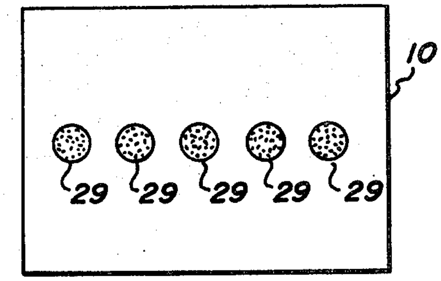
FIG. 2a and 2b illustrate a typical code formed on the document and reference transparency, respectively, the code being shown in detail in FIG. 2*c;*

FIG. 2*a* illustrates a pattern 29 which may be formed on document 10 for identification purposes.

Figure 2B:
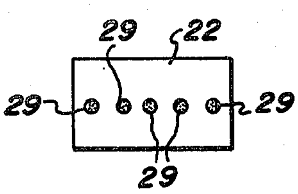
Figure 2C:
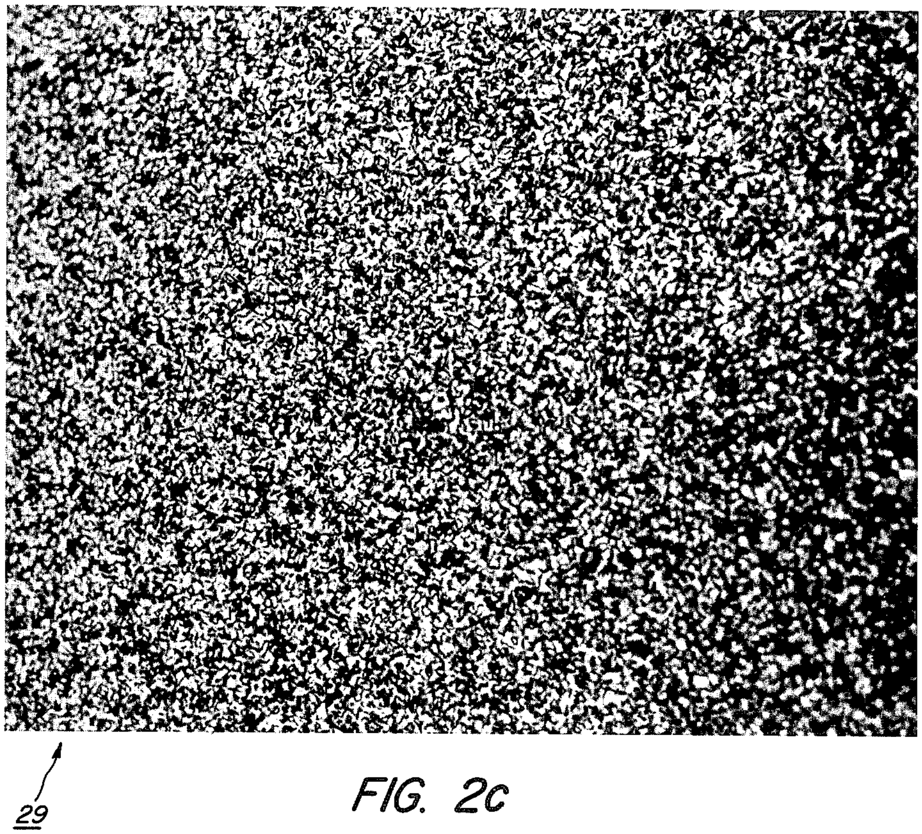

Pattern 29, shown in detail in FIG. 2*c*, comprises a random, high resolution diffraction pattern of black and white areas which may be produced by focusing a laser spot onto a ground glass screen, the laser light being allowed to diverge onto the screen, the resultant pattern thereafter being photographed. The pattern is subsequently printed on paper stock, the paper stock being utilized for documents which are to be controlled in accordance with the teachings of the present invention. The photographed pattern is, by standard techniques, utilized to form the reference transparency 22 wherein opaque and transparent areas corresponding to the pattern are formed. In a preferred embodiment, the random pattern is printed on the paper stock in an ink which appears black and white in the near infrared spectral region but which appears white through out the visible spectral region for the reasons set forth hereinbelow with reference to FIG. 5.

FIG. 2*b* shows pattern 29 formed along a single row, five column array on reference transparency 22 although various other pattern configurations may be utilized.

Random pattern 29 alternately may be produced by displaying white noise generated by a computer program on a cathode ray tube and then photographing the displayed pattern or by photographing sandpaper illuminated by light having a relatively small (shallow) angle of incidence.

A mechanical device may be provided for sequentially moving various patterns formed on a continuous film in order to form a variable reference transparency whereby a different pattern (code) can automatically be inserted into the copying machine. Alternately, the reference transparency 22 can be manually replaced if desired.

The system as set forth in FIG. 1 allows the simultaneous identification of an input code having a plurality of identical reference patterns. Alternatively, an input code having difference patterns thereon may be indentified with a set of transparencies each of which is capable of recognizing each distinct pattern. This identification procedure would produce output signals which would permit identification of the complete pattern. This can be accomplished by sequentially introducing into the system the proper reference transparency 22 which would be needed to identify the specified code pattern. In this situation, the photodetector array could be replaced with a single photodetector.

Figure 3:
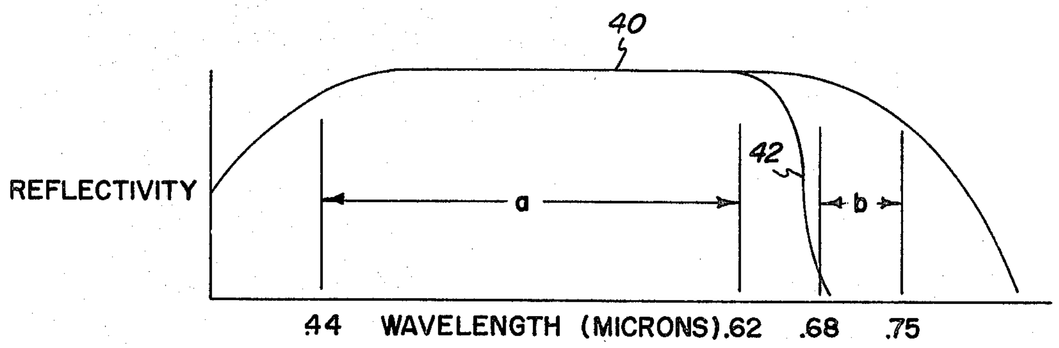
FIG. 3 is a graph illustrating reflectivity characteristics.

It should be noted that the pattern may be printed on the document in ink which is invisible to the exposure light utilized but possessing high contrast at longer wavelengths. In this regard, FIG. 3 illustrates an optical reflectivity graph, line curve 40 representing the reflectivity of ink used to print the pattern (code). The spectral region *a* (blue through red) indicates a typical response curve for a xerographic photoreceptor. Therefore, if ink having the optical reflectivity characteristic represented by line curve 42 is written on document 10 and a radiation source which generates radiation in the spectral region *b* is used to scan document 10 for correlation purposes, a copy enable signal will appear on lead 28 if there is optical correlation, the document being copied without the code visibly appearing. Marking the code with the ink as set forth hereinabove requires two exposure sources, (or, equivalently, a single source which generates radiation in both spectral regions *a* and *b*), the first to scan the document with radiation in spectral region *b* and a second scan for copying purposes with light in the spectral region *a* when a copy enable signal is present on lead 28.

Figure 4:
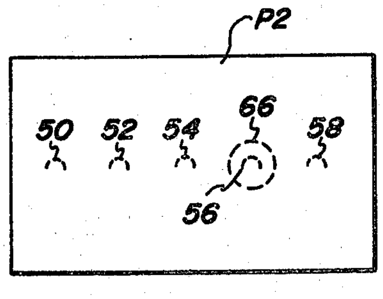
FIG. 4 shows a typical output formed at the correlation plane.

FIG. 4 illustrates the output appearing at plane P2 if correlation has been detected. In particular, an array of intense points of radiation 50, 52, . . . 58 on a uniform background of lower brightness is shown, the array of radiation points corresponding to the array of reference patterns shown in FIGS. 2*a* and 2*b*.

FIG. 5 illustrates a simplified logic circuit arrangement which may be utilized to generate an electrical output signal on lead 28 (FIG. 1) when correlation is present. In particular, a vidicon 60, responsive to the selected exposure radiation, is provided in place of the photodetector array 24 to scan a portion of correlogram plane P2. If a point of radiation is present in the scanned portion, the radiation point is converted to an electrical pulse 62 which is coupled to lead 28 via DC blocking capacitor 64. The capacitor 64, acting as a logic element, only passes the electrical pulses which correspond to the scanned points of radiation while blocking electrical signals, such as noise, in the portions of the scanned plane P2 which do not contain the points of radiation.

Referring to FIG. 4, the scanned portion of plane P2 may comprise a circular area which, as shown, encompasses radiation point 56. Utilizing an array of reference patterns (and the correspondingly generated array of light points) allows correlation to be detected although the document and reference transparency may be misaligned.

Figure 6:
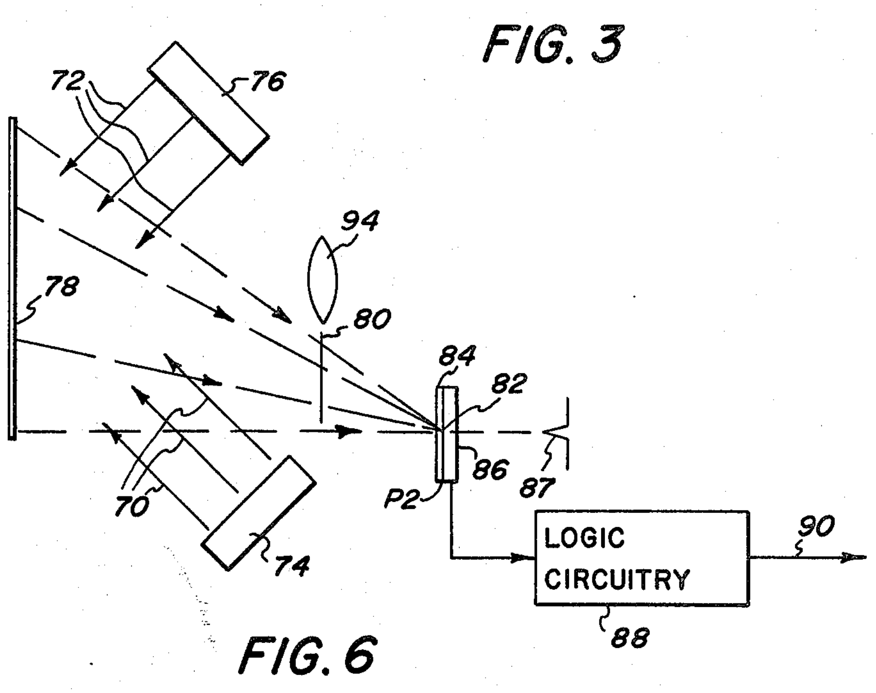
FIG. 6 illustrates apparatus for implementing a second embodiment oof th present invention.

FIG. 6 illustrates a second embodiment of the invention wherein lensless geometrical correlation techniques are utilized to achieve optical correlation. It should be noted that in lieu of the geometrical correlation techniques set forth in with reference to FIGS. 1 and 6, coherent Fourier transform techniques which require relatively complex optical parameters may be utilized.

The rays of radiation 70 and 72 produced from radiation sources 74 and 76 respectively, are directed to the surface of document 78, the document 78 having a reference pattern, or code, thereon as described hereinabove. The rays of light which are reflected from the bright areas on the document 78 are transmitted through corresponding transparent areas of the reference transparency 80, reference transparency 80 being a minified copy of the code expected on document 78, the rays intersecting at the common point (actually a line into the paper) 82 for correlation in two dimensions in correlation plane P2. Reference transparency 80 has regions which are transparent or opaque and preferably comprises the random pattern shown in FIG. 2*C*. A spectral filter 84 may be interposed between the light rays exiting from reference transparency 80 and the correlogram plane P2. A linear photo diode detector array 86, or a vidicon as set forth hereinabove, is positioned adjacent the other side of spectral filter 84 and generates an electrical signal which is proportional to the intensity of the light incident thereon. When correlation exists, all rays from points in document 78 which transit corresponding points in reference transparency 80 will intersect at point 82 in the plane P2. The intensity at point 82 will be unchanged if reference 80 were removed since reference 80 blocks no rays from document 78. All other points in plane P2 will, however, be reduced in intensity by the presence of reference transparency 80. Correlation of document 78 with reference 80 will therefore be indicated by an intensity spike 87 at point 82 (shown at the right-hand portion of the figure). The optical pattern detected on the linear detector array 86 is read out in serial fashion subsequent to the initial exposure of document 78. The relative spike position in the output signal then drives logic circuitry 88 in a manner as set forth hereinabove above. Absence of an output signal on line 90 indicates that the copying machine is to be disabled and copying inhibited.

Copy lens 94, which is utilized in the machine copying mode, is shown in the normal copying position. As shown, the light rays reflected from document 78 are directed below copy lens 94 (off-axis) so that the normal copying mode of machine operation would not be interfered with when a signal appears on copy enable line 90.

Image correlation is ideally suited to recognize large area patterns which may have fine grain detail. Further, image correlation can recognize a class of variants, as for example, the superposition of two or more identical codes having relative lateral translation. Further, the code may itself be masked by superfluous markings without loss of detectability of the desired code.

Preferably, the code markings should be black and white within the spectral band being utilized, as set forth hereinabove, and can be located at any position on the document or copy paper. Further, in order to provide the feature of attitude insensitivity, the code, or pattern, could be circularly symmetrical.

One-dimensional patterns offer a potential economy in hardware since only a single linear array of detectors, in one embodiment, are needed to detect and identify the pattern, such a pattern taking the form of long, straight lines extending the width (or length) of the document. Hardware advantages, however, should be compared with the disadvantage of loss of attitude insensitivity. Since the pattern is insensitive to the exact position on the document, more than one pattern may be included on the paper length (or width) as set forth hereinabove. The number of detector elements depend on the correlogram resolution required which in turn is dependent upon security requirements.

Figure 7:
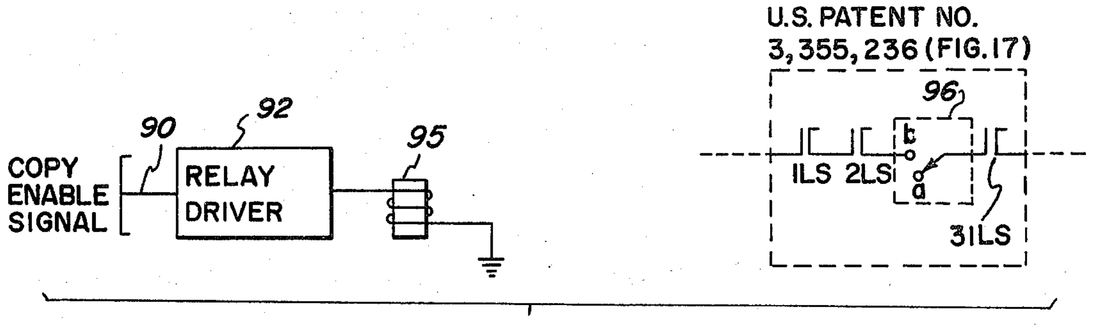
FIG. 7 schematically illustrates how the copy enable signal generated by the apparatus shown in FIG. 1 and FIG. 6 controls the operation of a copying machine.

The copy enable signal, as set forth hereinabove, determines whether or not the copying machine is activated for copying. Generally speaking, most copying machines presently available have interlock systems therein wherein the copyinng machine is operative only if certain conditions are present. For example, in U.S. Pat. No. 3,355,236, before the copying apparatus disclosed therein can be actuated, the doors of the cabinet enclosing the system must be closed to actuate particular interlock switches (see FIG. 17 in the U.S. Pat. No. 3,355,236) which are used so that the machine may be operated only when the doors of the cabinet are closed. In this patent, a further interlock switch is positioned on the conveyor lamp housing which can only be actuated by closing the lamp housing. Therefore, in order to modify the copying apparatus in accordance with the teachings of the present invention, the copy enable signal is utilized to operate a relay circuit which includes a relay contact in the interlock system disclosed in FIG. 17 of U.S. Pat. No. 3,355,236. FIG. 7 is a simplified drawing of a portion of FIG. 17 illustrating how the copy enable signal generated on leads 28 (FIG. 1) or 90 (FIG. 6) can control the operation of a copying machine modified in accordancce with the teachings of the present invention. The relay driver 92 which controls the operation of relay 95, is energized when a copy enable signal is present on lead 90 (or lead 28). Relay contact 96 (considered to be an interlock switch in accordance with the terminology used in the aforementioned patent) is normally open at position a (the relay 94 is normally inoperative) thereby inhibiting the operation of the copying apparatus. When the copy enable signal is present, relay driver 92 is energized, causing relay contract 96 to move to terminal *b*, thereby allowing the copying machine to be operative, assuming that all the other interlock switches are similarly closed.

Obviously, other copying machines may be similarly modified to be responsive to the presence or absence of the copy enable signal whereby control of document copying is obtained.

While the invention has been described with reference to its preferred embodiment, it will be understood by those skilled in the art that various changes may be made and equivalents substituted for elements thereof without departing from the true spirit and scope of the invention. In addition, many modifications may be made to adapt a particular situation or material to the teachings of the invention without departing from its essential teachings.

What is claimed is:

1. A copying system modified to selectively control the reproduction of information contained on an information bearing member comprising in combination, a copying device responsive to radiation within a predetermined region of the spectrum, an information bearing member having information and a first code formed thereon, means for generating radiation of a first wavelength and directing said radiation to said information bearing member, a reference transparency positioned in the path of the radiation transmitted from said information bearing member, said reference transparency comprising a second code which is correlated with a predetermined code, means responsive to the radiation transmitted through said reference transparency for generating a control signal when said first code is said predetermined code and not generating a signal when said first code is not said predetermined code, and means coupled to said responsive means and operatively associated with said copying device for enabling said copying device to reproduce the information on said information bearing member when said control signal is generated by said responsive means and for inhibiting said copying device from reproducing said information when a control signal is not generated by said responsive means.

2. The system defined in claim 1 wherein said first and second codes comprise a random, high resolution diffraction pattern of transparent and opaque areas.

3. The system as defined in claim 1 wherein said first code comprises a random, high resolution diffraction pattern of reflective and non-reflective areas and said second code comprises a random, high resolution diffraction pattern of transparent and opaque areas.

4. The system as defined in claim 1 wherein said information receiving member has a coded portion thereon.

5. The system as defined in claim 1 further including means for exposing said information bearing member to radiation which is different than said first wavelength when said copying device is enabled, said copying device being responsive to said different radiation, whereby said information is copied onto said information receiving member.

6. The system as defined in claim 5 wherein said first code is not reproduced on said image receiving member.

7. The system as defined in claim 1 wherein said first code comprises a plurality of indentical random patterns.

8. The system as defined in claim 1 wherein said responsive means comprises a radiation sensitive device responsive to the radiation transmitted through said reference transparency and incident on a selected area in a correlation plane and which generates an electrical signal the magnitude of which is proportional to the intensity of the transmitted radiation and logic means coupled to said radiation sensitive device for genenrating said control signal only when said second code is correlated with said first code and not generating a control signal if correlation is not present.

9. The system as defined in claim 8 wherein said control signal is operatively coupled to interlock means within the copying device, the absence of said control signal inhibiting operation of said copying device.

10. A method for controlling a copying device whereby the reproduction of information contained on an information bearing member is selectively controlled comprising the steps of:

providing an information bearing member having information and a first code formed thereon, generating radiation of a first wavelength and directing said radiation to said information bearing member, positioning a reference transparency in the path of the radiation transmitted from said information bearing member, said reference transparency comprising a second code which is correlated with a predetermined code, generatng a control signal in response to the radiation transmitted through said reference transparency when said first code is said predetermined code and not generating a control signal when said first code is not said predetermined code, and enabling said copying device to reproduce the information on said information bearing member when said control signal is generated and for inhibiting said copying device from reproducing said information when said control signal is not generated.

11. The method as defined in claim 10 wherein said first and second codes comprise a random, high resolution diffraction pattern of transparent and opaque areas.

12. The method as defined in claim 10 wherein said first code comprises a random, high resolution diffraction pattern of reflective and non-reflective areas and said second code comprises a random, high resolution diffraction pattern of transparent and opaque areas.

13. The method as defined in claim 10 further including the step of reproducing said information on an information receiving member.

14. The method as defined in claim 13 further including the step of exposing said information bearing member to radiation having a wavelength which is different than said first wavelength when said copying device is enabled, said copying device being responsive to said different radiation, whereby said information is copied onto said information receiving member.

15. The method as defined in claim 14 wherein said first code is not reproduced on said image receiving member.

16. The method as defined in claim 10 wherein said first code comprises a plurality of identical random patterns.

17. The method as defined in claim 10 wherein said control signal is operatively coupled to interlock means within the copying device, the absence of said control signal inhibiting operation of said copying device.

18. The systems as defined in claim 1 wherein said copying device reproduces the information contained on said information bearing member onto an information receiving member.

19. The method as defined in claim 13 wherein said information receiving member has a coded portion thereon.

20. For use with a copying device which is responsive to radiation within a predetermined region of the spectrum, said copying device reproducing information contained on an information bearing member onto an information receiving member, apparatus for selectively controlling the operation of said copying device comprising:

means for generating radiation of a first wavelength and directing said radiation to said information bearing member, said information bearing member having information and a first code thereon, a reference transparency positioned in the path of the radiation transmitted from said information bearing member, said reference transparency comprising a second code which is correlated with a predetermined code, means responsive to the radiation transmitted through said reference transparency for generating a control signal when said first code is said predetermined code and not generating a control signal when said first code is not said predetermined code, and means responsive to said control signal and operatively associated with the copying device whereby the operation thereof is controlled, the copying device being enabled to reproduce the information on said information bearing member when said control signal is generated by said radiation responsive means and said copy device being inhibited from reproducing said information when a control signal is not generated by said radiation responsive means.

21. The apparatus as defined in claim 20 wherein said radiation responsive means comprises a radiation sensitive device responsive to the radiation transmitted through said reference transparency and incident on a selected area in a correlation plane and which generates an electrical signal the magnitude of which is proportional to the intensity of the transmitted radiation and logic means coupled to said radiation sensitive device for generating said control signal only when said second code is correlated with said first code and not generating a control signal if correlation is not present.

22. The apparatus as defined in claim 21 wherein said means operatively associated with said copying device comprises interlock means.

* * * * *